(12) United States Patent
Ranjan et al.

(10) Patent No.: US 11,686,515 B2
(45) Date of Patent: Jun. 27, 2023

(54) MEMBRANE PURGE SYSTEM

(71) Applicant: Carrier Corporation, Palm Beach Gardens, FL (US)

(72) Inventors: Rajiv Ranjan, South Windsor, CT (US); Yinshan Feng, Manchester, CT (US); Parmesh Verma, South Windsor, CT (US); Michael A. Stark, Mooresville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/734,844

(22) PCT Filed: Nov. 27, 2019

(86) PCT No.: PCT/US2019/063502
§ 371 (c)(1),
(2) Date: Dec. 3, 2020

(87) PCT Pub. No.: WO2020/117580
PCT Pub. Date: Jun. 11, 2020

(65) Prior Publication Data
US 2021/0231354 A1 Jul. 29, 2021

Related U.S. Application Data

(60) Provisional application No. 62/774,722, filed on Dec. 3, 2018.

(51) Int. Cl.
*F25B 43/04* (2006.01)
*B01D 19/00* (2006.01)
(Continued)

(52) U.S. Cl.
CPC ........ *F25B 43/043* (2013.01); *B01D 19/0031* (2013.01); *B01D 71/028* (2013.01); *F04B 39/16* (2013.01)

(58) Field of Classification Search
None
See application file for complete search history.

(56) References Cited

U.S. PATENT DOCUMENTS

| 2,044,166 A | 6/1936 | Hayden |
| 4,304,102 A | 12/1981 | Gray |

(Continued)

FOREIGN PATENT DOCUMENTS

| CN | 1791774 A | 6/2006 |
| CN | 101254918 A | 9/2008 |

(Continued)

OTHER PUBLICATIONS

"Cascade Reverse Osmosis and the Absorption Osmosis Cycle"; Battelle Memorial Institute; ARPA-E; Retrieved Online from http://arpa-e.energy.gov/?q=slick-sheet-project/cascade-reverse-osmosis-air-conditioning-system on Jul. 12, 2010; 1 Page.

(Continued)

*Primary Examiner* — Jason M Greene
(74) *Attorney, Agent, or Firm* — Cantor Colburn LLP (57) ABSTRACT

A separator for removing contamination from a fluid of a heat pump includes a housing having a hollow interior, a separation component mounted within the hollow interior, and at least one turbulence-generating element positioned within the hollow interior adjacent the separation component.

17 Claims, 6 Drawing Sheets

(51) Int. Cl.
  *B01D 71/02* (2006.01)
  *F04B 39/16* (2006.01)

(56) References Cited

U.S. PATENT DOCUMENTS

| | | | |
|---|---|---|---|
| 4,316,364 A | 2/1982 | Spauschus | |
| 4,417,451 A | 11/1983 | Spauschus | |
| 4,842,621 A | 6/1989 | Robbims et al. | |
| 4,906,256 A | 3/1990 | Baker et al. | |
| 4,984,431 A | 1/1991 | Mount et al. | |
| 5,032,148 A | 7/1991 | Baker et al. | |
| 5,044,166 A | 9/1991 | Wijmans et al. | |
| 5,059,374 A | 10/1991 | Krueger et al. | |
| 5,062,273 A | 11/1991 | Lee et al. | |
| 5,071,451 A | 12/1991 | Wijmans | |
| 5,089,033 A | 2/1992 | Wijmans | |
| 5,156,657 A | 10/1992 | Jain et al. | |
| 5,355,685 A | 10/1994 | Stie et al. | |
| 5,429,662 A | 7/1995 | Fillet | |
| 5,598,714 A | 2/1997 | Strout et al. | |
| 5,611,841 A | 3/1997 | Baker et al. | |
| 5,636,526 A | 6/1997 | Plzak et al. | |
| 5,718,119 A | 2/1998 | Wakita et al. | |
| 5,806,322 A | 9/1998 | Cakmakei et al. | |
| 5,842,349 A | 12/1998 | Wakita et al. | |
| 5,858,065 A | 1/1999 | Li et al. | |
| 6,128,916 A | 10/2000 | Callahan et al. | |
| 6,134,899 A | 10/2000 | Brown et al. | |
| 6,224,763 B1* | 5/2001 | Feng | B01D 63/02 210/232 |
| 6,442,963 B1 | 9/2002 | Pfefferle et al. | |
| 6,457,326 B1 | 10/2002 | Serpente et al. | |
| 6,527,831 B2 | 3/2003 | Baksh et al. | |
| 6,705,100 B2 | 3/2004 | Heiden et al. | |
| 6,790,350 B2 | 9/2004 | Pex et al. | |
| 6,925,821 B2 | 8/2005 | Sienel | |
| 7,188,480 B2 | 3/2007 | Korin | |
| 7,282,148 B2 | 10/2007 | Dalton et al. | |
| 7,357,002 B2 | 4/2008 | Yoshimi et al. | |
| 7,387,661 B2 | 6/2008 | Qunwei et al. | |
| 7,690,219 B2 | 4/2010 | Suzuki et al. | |
| 7,713,333 B2 | 5/2010 | Rege et al. | |
| 7,758,670 B2 | 7/2010 | Wynn et al. | |
| 7,765,830 B2 | 8/2010 | Zhang | |
| 7,891,202 B1 | 2/2011 | Gallus | |
| 7,918,921 B2 | 4/2011 | Wynn | |
| 8,055,453 B2 | 11/2011 | Wyatt | |
| 8,182,592 B2 | 5/2012 | Nakamura et al. | |
| 8,216,473 B2 | 7/2012 | Wohlert | |
| 8,361,197 B2 | 1/2013 | Kawai et al. | |
| 8,394,171 B2 | 3/2013 | Elseviers et al. | |
| 8,580,015 B2 | 11/2013 | Taylor et al. | |
| 8,652,332 B2 | 2/2014 | Karnik et al. | |
| 9,067,169 B2 | 6/2015 | Patel | |
| 9,073,808 B1 | 7/2015 | Su et al. | |
| 9,175,233 B2 | 11/2015 | Goldstein et al. | |
| 9,199,191 B2 | 12/2015 | Fukuda et al. | |
| 9,216,373 B2 | 12/2015 | Girondi | |
| 9,504,962 B2 | 11/2016 | Yamaoka et al. | |
| 9,579,605 B1 | 2/2017 | Su et al. | |
| 9,610,534 B1 | 4/2017 | Thompson | |
| 9,718,023 B2 | 8/2017 | Kanetsuki et al. | |
| 9,987,568 B2 | 6/2018 | Stark et al. | |
| 9,989,285 B2 | 6/2018 | Fountain et al. | |
| 10,584,906 B2 | 3/2020 | Ranjan et al. | |
| 2002/0148238 A1 | 10/2002 | Blume | |
| 2003/0075504 A1* | 4/2003 | Zha | B01D 63/02 210/636 |
| 2003/0121840 A1* | 7/2003 | Pex | B01D 63/06 210/321.81 |
| 2006/0011535 A1 | 1/2006 | Ikeda et al. | |
| 2006/0254422 A1* | 11/2006 | Spadaccini | B01D 19/0031 96/6 |
| 2007/0101759 A1 | 5/2007 | Matsuoka et al. | |
| 2007/0113581 A1 | 5/2007 | Yoshimi et al. | |
| 2007/0193285 A1 | 8/2007 | Knight et al. | |
| 2008/0202152 A1 | 8/2008 | Munoz et al. | |
| 2008/0202153 A1 | 8/2008 | Watanabe | |
| 2008/0217247 A1 | 9/2008 | Niino et al. | |
| 2010/0006503 A1 | 1/2010 | Bratton et al. | |
| 2011/0120157 A1 | 5/2011 | Wohlert | |
| 2012/0000220 A1 | 1/2012 | Altay | |
| 2013/0118198 A1 | 5/2013 | Brown et al. | |
| 2013/0283830 A1 | 10/2013 | Jandal et al. | |
| 2013/0283832 A1 | 10/2013 | Kujak et al. | |
| 2015/0053083 A1* | 2/2015 | Taylor | B01D 19/0031 96/6 |
| 2015/0323226 A1 | 11/2015 | Haraki et al. | |
| 2016/0025393 A1 | 1/2016 | Rockwell | |
| 2016/0175740 A1 | 6/2016 | Stark et al. | |
| 2017/0014748 A1 | 1/2017 | Li et al. | |
| 2017/0122670 A1 | 5/2017 | Ahlbom | |
| 2017/0307269 A1 | 10/2017 | Gu et al. | |
| 2017/0348643 A1 | 12/2017 | Noguchi et al. | |
| 2018/0066880 A1 | 3/2018 | Ranjan | |
| 2018/0243685 A1* | 8/2018 | Henson | B01D 53/22 |
| 2021/0229024 A1 | 7/2021 | Ranjan et al. | |
| 2021/0364202 A1 | 11/2021 | Ranjan et al. | |
| 2021/0364203 A1 | 11/2021 | Ranjan et al. | |

FOREIGN PATENT DOCUMENTS

| | | |
|---|---|---|
| CN | 101373111 A | 2/2009 |
| CN | 201363956 Y | 12/2009 |
| CN | 101910756 A | 12/2010 |
| CN | 201954828 U | 8/2011 |
| CN | 101852524 B | 7/2012 |
| CN | 203657302 U | 6/2014 |
| CN | 104785045 A | 7/2015 |
| CN | 106895617 A | 6/2017 |
| CN | 107763910 A | 3/2018 |
| CN | 108061410 A | 5/2018 |
| CN | 108344214 A | 7/2018 |
| CN | 108413665 A | 8/2018 |
| CN | 108474601 A | 8/2018 |
| EP | 0284850 B1 | 10/1988 |
| EP | 0875281 A1 | 11/1998 |
| EP | 0943367 A1 | 9/1999 |
| EP | 1650509 A1 | 4/2006 |
| EP | 1681523 A1 | 7/2006 |
| EP | 2312241 A1 | 4/2011 |
| EP | 2815798 A1 | 12/2014 |
| EP | 3085430 A1 | 10/2016 |
| EP | 3118545 A1 | 1/2017 |
| GB | 1112580 A | 5/1968 |
| GB | 2011796 A | 7/1979 |
| GB | 2276229 A | 9/1994 |
| JP | H0552452 A | 3/1993 |
| JP | H0557125 A | 3/1993 |
| JP | H07294065 A | 11/1995 |
| JP | H10213363 A | 8/1998 |
| JP | 2005127561 A | 5/2005 |
| JP | 2005127563 A | 5/2005 |
| JP | 2005127564 A | 5/2005 |
| JP | 2005127565 A | 5/2005 |
| JP | 4265369 B2 | 5/2009 |
| JP | 2010159952 A | 7/2010 |
| JP | 11248298 | 9/2011 |
| JP | 2013039546 A | 2/2013 |
| JP | 5585307 | 9/2014 |
| KR | 101533348 B1 | 7/2015 |
| WO | 9717125 A1 | 5/1997 |
| WO | 2015020719 A1 | 2/2015 |
| WO | 2017184663 A1 | 10/2017 |
| WO | 2018134789 A1 | 7/2018 |

OTHER PUBLICATIONS

"Non-Condensable Gas Purge Equipment for Use with Low Pressure Centrifugal Liquid Chillers"; AHRI Laboratory; Air-Conditioning Heating, & Refrigeration Institute; Oct. 26, 2018; 2 Pages.

(56) References Cited

OTHER PUBLICATIONS

Biruh Shimekit and Hilmi Mihtar (2012). Natural Gas Purification Technologies—Major Advances for CO2 Separation and Future Directions, Advances in Natural Gas Technology, Dr. Hamid Al-megren (Ed.)ISBN:978-953-51-0507-7, pp. 235-270, http://cdn.intechopen.com/pdfs/35293/InTech-Natural_gas_purification_technologies_major_advances_for_co2_separation_and_future_directions.pdf.
Chinese Office Action and Search Report from Chinese Application No. 201480044756.4 dated Apr. 28, 2017; 17 Pages.
Chinese Office Action and Search Report from Chinese Application No. 201480044756.4 dated Dec. 14, 2017; 18 Pages.
Coronas et al.; "Separations Using Zeolite Membranes"; Separation and Purification Methods; vol. 28, Issue 2 1999; 6 Pages.
Daramola et al.; "Potential Applications of Zeolite Membranes in Reaction Coupling Separation Processes"; Materials; vol. 5; 2012; pp. 2101-2136.
Extended European Search Report; International Application No. 18205247.2-1008; International Filing Date: Nov. 8, 2018; dated Mar. 14, 2019; 7 pages.
International Search Report of the International Searching Authority; International Application No. PCT/US2014/040795; International filing date: Jun. 4, 2014; dated Aug. 29, 2014, 4 pages.
Rao et al.; "Nanoporous Carbon Membranes for Separation of Gas Mixtures by Selective Surface Flow"; Journal of Membrane Science; vol. 85, Issue 3; Dec. 2, 1993; pp. 253-264.
U.S. Non-Final Office Action; U.S. Appl. No. 14/909,542; Application Filing Date: Feb. 2, 2016; dated Sep. 21, 2017; 23 pages.
U.S. Non-Final Office Action; U.S. Appl. No. 15/808,837; Application Filing Date: Nov. 9, 2017; dated Jun. 6, 2019; 32 pages.
Written Opinion of the International Searching Authority; International Application No. PCT/US2014/040795; International Filing Date: Jun. 4, 2014; dated Aug. 29, 2014; 4 pages.
International Search Report of the International Searching Authority; International Application No. PCT/US2019/063502; International Filing Date: Nov. 27, 2019; dated Mar. 30, 2020; 8 pages.
International Search Report of the International Searching Authority; International Application No. PCT/US2019/063512; International Filing Date: Nov. 27, 2019; dated Feb. 18, 2020; 5 pages.
International Search Report of the International Searching Authority; International Application No. PCT/US2019/063657; International Filing Date: Nov. 27, 2019; dated Feb. 18, 2020; 5 pages.
International Search Report of the International Searching Authority; International Application No. PCT/US2019/064174; International Filing Date: Dec. 3, 2019; dated Feb. 18, 2020; 6 pages.
Written Opinion of the International Searching Authority; International Application No. PCT/US2019/063502 International Filing Date: Nov. 27, 2019; dated Mar. 30, 2020; 10 pages.
Written Opinion of the International Searching Authority; International Application No. PCT/US2019/063512; International Filing Date: Nov. 27, 2019; dated Feb. 18, 2020; 7 pages.
Written Opinion of the International Searching Authority; International Application No. PCT/US2019/063657 International Filing Date: Nov. 27, 2019; dated Feb. 18, 2020; 7 pages.
Written Opinion of the International Searching Authority; International Application No. PCT/US2019/064174; International Filing Date: Dec. 3, 2019; dated Dec. 3, 2018; 7 pages.
International Preliminary Report on Patentability; International Application No. PCT/US2019/063502; International Filing Date: Nov. 27, 2019; dated Jun. 17, 2021; 10 pages.
International Preliminary Report on Patentability; International Application No. PCT/US2019/063512; International Filing Date: Nov. 27, 2019; dated Jun. 17, 2021; 7 pages.
International Preliminary Report on Patentability; International Application No. PCT/US2019/063657; International Filing Date: Nov. 27, 2019; dated Jun. 17, 2021; 7 pages.
International Preliminary Report on Patentability; International Application No. PCT/US2019/064174; International Filing Date: Dec. 3, 2019; dated Jun. 17, 2021; 7 pages.
Chinese First Office Action; Chinese Application No. 201980041006.4; dated Jul. 15, 2022; 14 pages.
Chinese First Office Action; Chinese Application No. 201980041011.5; dated Aug. 5, 2022; 17 pages.
Chinese Office Action for Chinese Application No. 201980041015.3; Report dated Dec. 28, 2022 (pp. 1-8).

\* cited by examiner

MEMBRANE PURGE SYSTEM

CROSS REFERENCE TO RELATED APPLICATIONS

This application is a National Stage Application of PCT/US2019/063502, filed Nov. 27, 2019, which claims priority to U.S. Provisional Application 62/774,722 filed Dec. 3, 2018, both of which are incorporated by reference in their entirety herein.

BACKGROUND

Embodiments of the present disclosure relate generally to chiller systems used in air conditioning systems, and more particularly to a purge system for removing contaminants from a refrigeration system.

Chiller systems such as those utilizing centrifugal compressors may include sections that operate below atmospheric pressure. As a result, leaks in the chiller system may draw air into the system, contaminating the refrigerant. This contamination degrades the performance of the chiller system. To address this problem, existing low pressure chillers include a purge unit to remove contamination. Existing purge units typically use a vapor compression cycle to separate contaminant gas from the refrigerant. Existing purge units are complicated and lose refrigerant in the process of removing contamination.

BRIEF DESCRIPTION

According to an embodiment, a separator for removing contamination from a fluid of a heat pump includes a housing having a hollow interior, a separation component mounted within the hollow interior, and at least one turbulence-generating element positioned within the hollow interior adjacent the separation component.

In addition to one or more of the features described above, or as an alternative, in further embodiments the at least one turbulence-generating element extends into a flow of the fluid adjacent to the separation component.

In addition to one or more of the features described above, or as an alternative, in further embodiments the at least one turbulence-generating element extends adjacent to an exterior surface of the separation component.

In addition to one or more of the features described above, or as an alternative, in further embodiments the at least one turbulence-generating element includes a baffle.

In addition to one or more of the features described above, or as an alternative, in further embodiments the at least one turbulence-generating element includes a turbulator.

In addition to one or more of the features described above, or as an alternative, in further embodiments the at least one turbulence-generating element includes an ejector.

In addition to one or more of the features described above, or as an alternative, in further embodiments the at least one turbulence-generating element includes a plurality of turbulence-generating elements spaced along a longitudinal axis of the separation component.

In addition to one or more of the features described above, or as an alternative, in further embodiments the plurality of turbulence-generating elements are substantially identical.

In addition to one or more of the features described above, or as an alternative, in further embodiments a configuration of at least one of the plurality of turbulence-generating elements varies from a configuration of a remainder of the plurality of turbulence-generating elements.

According to an embodiment, a separator for removing contamination from a fluid of a heat pump system includes a housing having a hollow interior, a separation component mounted within the hollow interior, and at least one vibration isolator mounted at an interface of the separation component.

In addition to one or more of the features described above, or as an alternative, in further embodiments the at least one vibration isolator is positioned at an intermediate portion of the separation component.

In addition to one or more of the features described above, or as an alternative, in further embodiments the separation component is mounted within the hollow interior by at least one header plate.

In addition to one or more of the features described above, or as an alternative, in further embodiments the at least one vibration isolator is mounted between the separation component and the at least one header plate.

In addition to one or more of the features described above, or as an alternative, in further embodiments the at least one vibration isolator is mounted at a portion of the separator fluidly connectable to the heat pump system.

In addition to one or more of the features described above, or as an alternative, in further embodiments the at least one vibration isolator is mechanically connected, but not fluidly connected to the heat pump system.

In addition to one or more of the features described above, or as an alternative, in further embodiments the at least one vibration isolator is formed from a flexible material.

In addition to one or more of the features described above, or as an alternative, in further embodiments the at least one vibration isolator is a vibration dampening pad.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
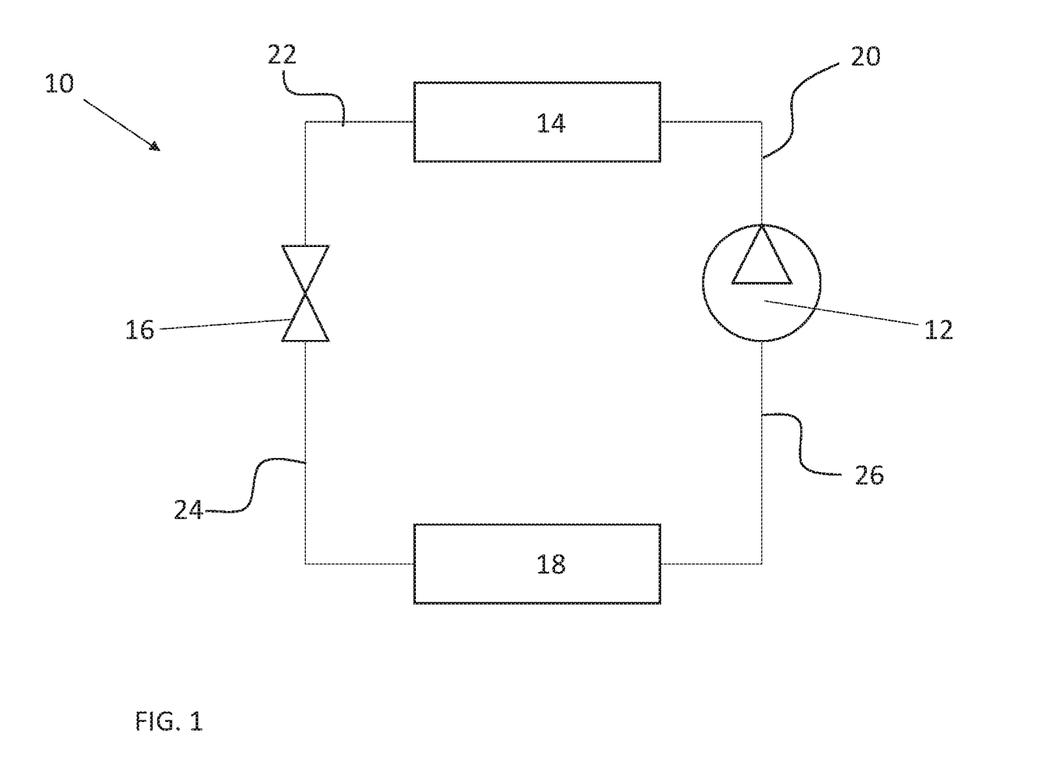
FIG. 1 is a schematic diagram of a heat pump of a refrigerant system.

Referring now to FIG. 1, an example of a heat pump 10 is illustrated. As used herein, the term heat pump is intended to include any system capable of heating and/or cooling, such as a vapor compression system, a sorption system, a geothermal system, a waste heat recovery system, a heat based cooling system, and a heating system. As shown, the heat pump 10 includes a compressor 12, a condenser 14, an expansion valve 16, and an evaporator 18 arranged to form a fluid loop. The compressor 12 pressurizes heat transfer fluid in its gaseous state, which both heats the fluid and provides pressure to circulate it through the system. In some embodiments, the heat transfer fluid, or refrigerant, includes an organic compound. For example, in some embodiments, the refrigerant comprises at least one of a hydrocarbon, substituted hydrocarbon, a halogen-substituted hydrocarbon, a fluoro-substituted hydrocarbon, or a chloro-fluoro-substituted hydrocarbon.

The hot pressurized gaseous heat transfer fluid exiting from the compressor 12 flows through a conduit 20 to a heat rejection heat exchanger such as condenser 14. The condenser is operable to transfer heat from the heat transfer fluid to the surrounding environment, resulting in condensation of the hot gaseous heat transfer fluid to a pressurized moderate temperature liquid. The liquid heat transfer fluid exiting from the condenser 14 flows through conduit 22 to expansion valve 16, where the pressure is reduced. The reduced pressure liquid heat transfer fluid exiting the expansion valve 16 flows through conduit 24 to a heat absorption heat exchanger such as evaporator 18. The evaporator 18 functions to absorb heat from the surrounding environment and boil the heat transfer fluid. Gaseous heat transfer fluid exiting the evaporator 18 flows through conduit 26 to the compressor 12, so that the cycle may be repeated.

The heat pump 10 has the effect of transferring heat from the environment surrounding the evaporator 18 to the environment surrounding the condenser 14. The thermodynamic properties of the heat transfer fluid must allow it to reach a high enough temperature when compressed so that it is greater than the environment surrounding the condenser 14, allowing heat to be transferred to the surrounding environment. The thermodynamic properties of the heat transfer fluid must also have a boiling point at its post-expansion pressure that allows the temperature surrounding the evaporator 18 to provide heat to vaporize the liquid heat transfer fluid.

Various types of refrigeration systems may be classified as a heat pump 10 as illustrated and described herein. One such refrigeration system is a chiller system. Portions of a refrigeration system, such as the cooler of a chiller system for example, may operate at a low pressure (e.g., less than atmosphere) which can cause contamination (e.g., ambient air) to be drawn into fluid loop of the heat pump 10. The contamination degrades performance of the refrigeration system. To improve operation, the heat pump 10 may additionally include a purge system 30 for removing contamination from the heat transfer fluid of the heat pump 10.

Figure 2:
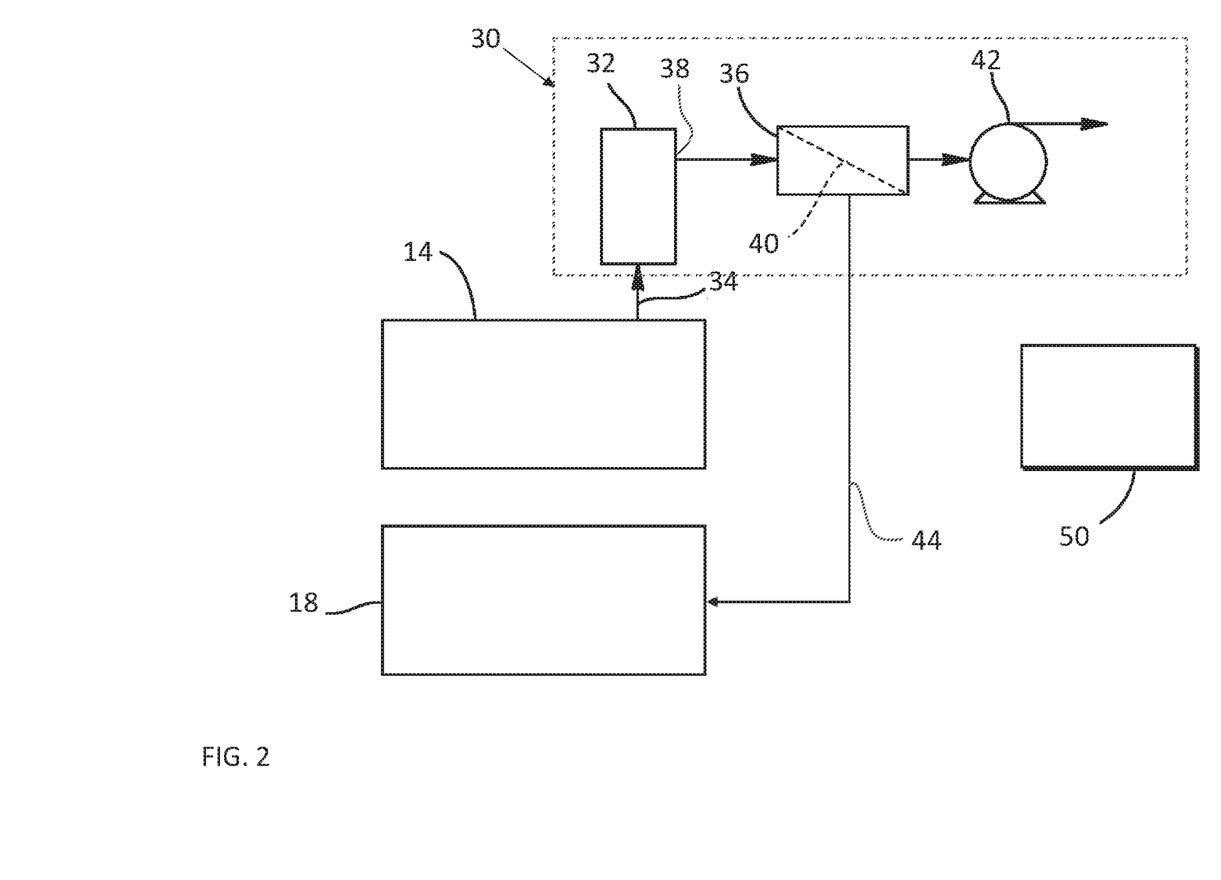
FIG. 2 is a schematic diagram of a purge system according to an embodiment.

With reference now to FIG. 2, an example of a purge system 30 is illustrated in more detail. As shown, the purge system 30 includes a purge collector 32 connected to the condenser 14 of a heat pump 10 via a purge connection 34. The purge collector 32 receives purge gas including refrigerant gas and contaminants, such as nitrogen and oxygen for example, from the purge connection 34. The purge system 30 additionally includes at least one separator 36 arranged downstream from and in fluid communication with an outlet 38 of the purge collector 32. In the illustrated, non-limiting embodiment, the separator 36 includes at least one separating component 40, such as a membrane for example, for separating contaminants from the refrigerant gas. Although a single separator 36 is illustrated, it should be understood that embodiments including a plurality of separators 36, arranged in series or parallel, are also contemplated herein.

In embodiments where the separation component 40 includes a membrane, the membrane may includes a porous inorganic material. Examples of porous inorganic material can include ceramics such as metal oxides or metal silicates, more specifically aluminosilicates, (e.g., Chabazite Framework (CHA) zeolite, Linde type A (LTA) zeolite, porous carbon, porous glass, clays (e.g., Montmorillonite, Halloysite). Porous inorganic materials can also include porous metals such as platinum and nickel. Hybrid inorganic-organic materials such as a metal organic framework (MOF) can also be used. Other materials can be present in the membrane such as a carrier in which a microporous material can be dispersed, which can be included for structural or process considerations.

Metal organic framework materials are well-known in the art, and comprise metal ions or clusters of metal ions coordinated to organic ligands to form one-, two- or three-dimensional structures. A metal-organic framework can be characterized as a coordination network with organic ligands containing voids. The coordination network can be characterized as a coordination compound extending, through repeating coordination entities, in one dimension, but with cross-links between two or more individual chains, loops, or spiro-links, or a coordination compound extending through repeating coordination entities in two or three dimensions. Coordination compounds can include coordination polymers with repeating coordination entities extending in one, two, or three dimensions. Examples of organic ligands include but are not limited to bidentate carboxylates (e.g., oxalic acid, succinic acid, phthalic acid isomers, etc.), tridentate carboxylates (e.g., citric acid, trimesic acid), azoles (e.g., 1,2,3-triazole), as well as other known organic ligands. A wide variety of metals can be included in a metal organic framework. Examples of specific metal organic framework materials include but are not limited to zeolitic imidazole framework (ZIF). HKUST-1.

In some embodiments, pore sizes of the material of the membrane can be characterized by a pore size distribution with an average pore size from 2.5 Å to 10.0 Å, and a pore size distribution of at least 0.1 Å. In some embodiments, the average pore size for the porous material can be in a range with a lower end of 2.5 Å to 4.0 Å and an upper end of 2.6 Å to 10.0 Å. A. In some embodiments, the average pore size can be in a range having a lower end of 2.5 Å, 3.0 Å, 3.5 Å, and an upper end of 3.5 Å, 5.0 Å, or 6.0 Å. These range endpoints can be independently combined to form a number of different ranges, and all ranges for each possible combination of range endpoints are hereby disclosed. Porosity of the material can be in a range having a lower end of 5%, 10%, or 15%, and an upper end of 85%, 90%, or 95% (percentages by volume). These range endpoints can be independently combined to form a number of different ranges, and all ranges for each possible combination of range endpoints are hereby disclosed.

The above microporous materials can be synthesized by hydrothermal or solvothermal techniques (e.g., sol-gel) where crystals are slowly grown from a solution. Templating for the microstructure can be provided by a secondary building unit (SBU) and the organic ligands. Alternate synthesis techniques are also available, such as physical vapor deposition or chemical vapor deposition, in which metal oxide precursor layers are deposited, either as a primary microporous material, or as a precursor to an MOF structure formed by exposure of the precursor layers to sublimed ligand molecules to impart a phase transformation to an MOF crystal lattice.

In some embodiments, the above-described membrane materials can provide a technical effect of promoting separation of contaminants (e.g., nitrogen, oxygen and/or water molecules) from refrigerant gas, which is condensable. Other air-permeable materials, such as porous or non-porous polymers can be subject to solvent interaction with the matrix material, which can interfere with effective separation. In some embodiments, the capabilities of the materials described herein can provide a technical effect of promoting the implementation of a various example embodiments of refrigeration systems with purge, as described in more detail with reference to the example embodiments below.

The membrane material can be self-supporting or it can be supported, for example, as a layer on a porous support or integrated with a matrix support material. In some embodiments, thickness of a support for a supported membrane can range from 50 nm to 1000 nm, more specifically from 100 nm to 750 nm, and even more specifically from 250 nm to 500 nm. In the case of tubular membranes, fiber diameters can range from 100 nm to 2000 nm, and fiber lengths can range from 0.2 m to 2 m.

In some embodiments, the microporous material can be deposited on a support as particles in a powder or dispersed in a liquid carrier using various techniques such as spray coating, dip coating, solution casting, etc. The dispersion can contain various additives, such as dispersing aids, rheology modifiers, etc. Polymeric additives can be used; however, a polymer binder is not needed, although a polymer binder can be included and in some embodiments is included such as with a mixed matrix membrane comprising a microporous inorganic material (e.g., microporous ceramic particles) in an organic (e.g., organic polymer) matrix. However, a polymer binder present in an amount sufficient to form a contiguous polymer phase can provide passageways in the membrane for larger molecules to bypass the molecular sieve particles. Accordingly, in some embodiments a polymer binder is excluded. In other embodiments, a polymer binder can be present in an amount below that needed to form a contiguous polymer phase, such as embodiments in which the membrane is in series with other membranes that may be more restrictive. In some embodiments, particles of the microporous material (e.g., particles with sizes of 0.01 μm to 10 mm, or in some embodiments from 0.5 μm to 10 μm) can be applied as a powder or dispersed in a liquid carrier (e.g., an organic solvent or aqueous liquid carrier) and coated onto the support followed by removal of the liquid. In some embodiments, the application of solid particles of microporous material from a liquid composition to the support surface can be assisted by application of a pressure differential across the support. For example a vacuum can be applied from the opposite side of the support as the liquid composition comprising the solid microporous particles to assist in application of the solid particles to the surface of the support. A coated layer of microporous material can be dried to remove residual solvent and optionally heated to fuse the microporous particles together into a contiguous layer. Various membrane structure configurations can be utilized, including but not limited to flat or planar configurations, tubular configurations, or spiral configurations. In some embodiments, the membrane can include a protective polymer coating or can utilize backflow or heating to regenerate the membrane.

In some embodiments, the microporous material can be configured as nanoplatelets, such as zeolite nanosheets for example. Zeolite nanosheet particles can have thicknesses ranging from 2 to 50 nm, more specifically 2 to 20 nm, and even more specifically from 2 nm to 10 nm. Zeolite such as zeolite nanosheets can be formed from any of various zeolite structures, including but not limited to framework type MFI, MWW, FER, LTA, FAU, and mixtures of the preceding with each other or with other zeolite structures. In a more specific group of exemplary embodiments, the zeolite such as zeolite nanosheets can comprise zeolite structures selected from MFI, MWW, FER, LTA framework type. Zeolite nanosheets can be prepared using known techniques such as exfoliation of zeolite crystal structure precursors. For example, MFI and MWW zeolite nanosheets can be prepared by sonicating the layered precursors (multilamellar silicalite-1 and ITQ-1, respectively) in solvent. Prior to sonication, the zeolite layers can optionally be swollen, for example with a combination of base and surfactant, and/or melt-blending with polystyrene. The zeolite layered precursors are typically prepared using conventional techniques for preparation of microporous materials such as sol-gel methods.

With continued reference to FIG. 2, a prime mover 42, such as a vacuum pump for example, may be selectively coupled to the separator 36. The prime mover 42 may provide a driving force to pass contaminant gas molecules through the separation component 40, such that the contaminant molecules exit from a second side of the membrane and through an outlet of the purge system 30. In an embodiment, the prime mover 42 can be positioned within the fluid loop. For example, a refrigerant pump or compressor may be used as the prime mover. Refrigerant gas tends to remain on the first side of the separation component 40 and may be returned to the heat pump 10, such as to the evaporator 18 for example, through a connection or conduit illustrated at 44.

A controller 50 is operably coupled to the prime mover 42 of the purge system 30. In an embodiment, the controller 50 receives system data (e.g., pressure, temperature, mass flow rates) and utilizes electronic control components, such as a microprocessor for example, to control one or more components of the purge system 30, such as various pumps, valves, and switches for example, in response to the system data. The purge system 30 illustrated and described herein is intended as an example only, and other configurations are also within the scope of the disclosure. Other examples of purge systems contemplated herein are set forth in more detail in U.S. patent application Ser. No. 15/808,837 filed on Nov. 9, 2017, the entire contents of which is incorporated herein by reference.

When the heat pump 10 is operational, the refrigerant may be passively decontaminated. The pressure from the condenser may create a pressure differential suitable to achieve the required driving force across the separation component 40. As a result, contamination passes through the membrane from a first side to a second side. When the heat pump 10 is non-operational, active decontamination of the separation component 40 is initiated. During active decontamination, the prime mover 42 is used to provide the necessary pressure differential across the separation component 40 for decontamination.

Figure 3:
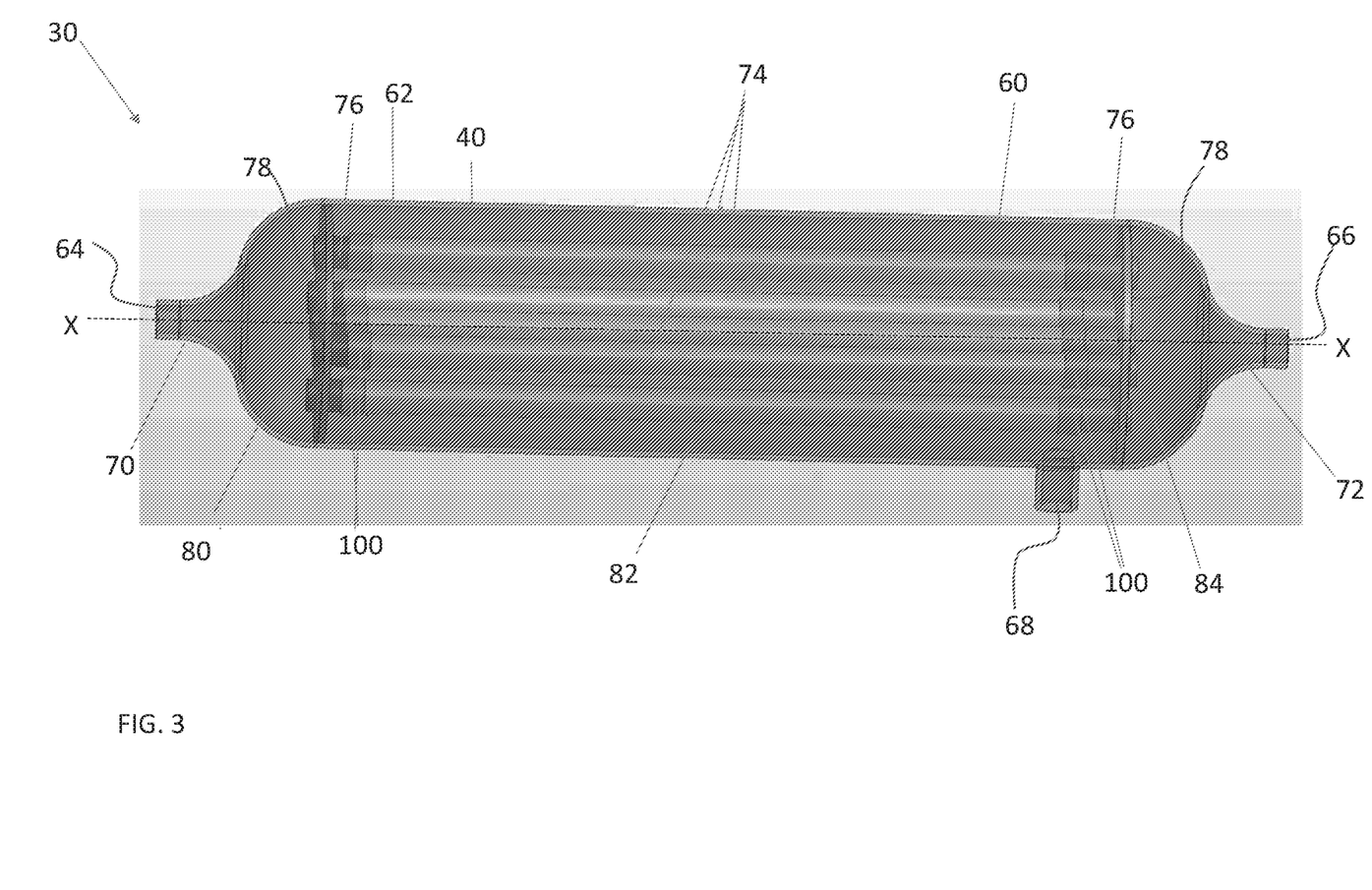
FIG. 3 is a perspective view of a separator of a purge system according to an embodiment.
Figure 4:
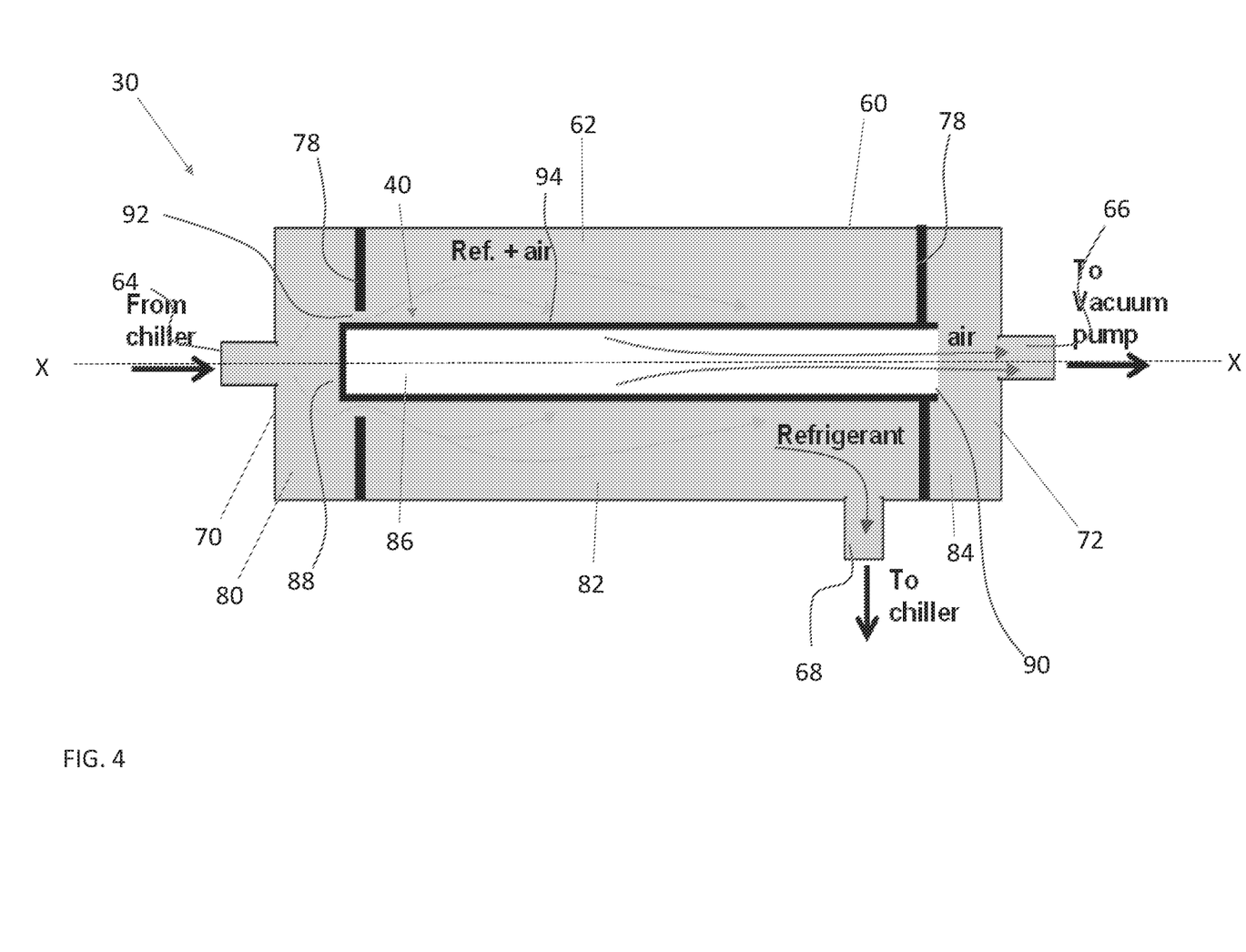
FIG. 4 is a schematic cross-sectional view of a separator of a purge system according to an embodiment.
Figure 5:
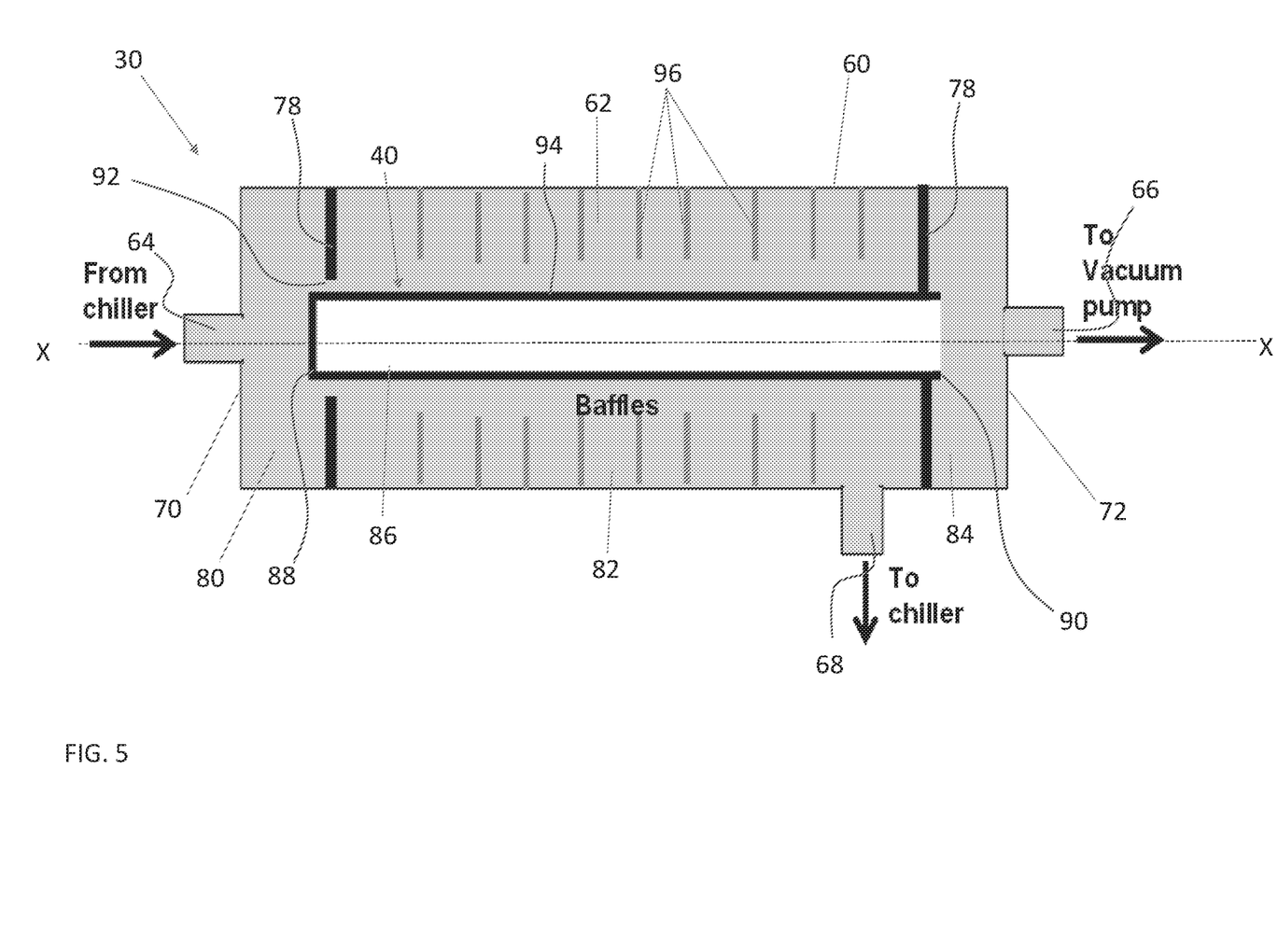
FIG. 5 is a schematic cross-sectional view of a separator of a purge system according to another embodiment.

With reference now to FIGS. 3-5, various configurations of the separator 36 are shown. In each of the embodiments illustrated herein, the separator 36 includes a housing 60 having a generally hollow interior 62. Although the housing 60 is shown as being generally cylindrical in shape, it should be understood that a housing 60 having any shape is within the scope of the disclosure. In addition, the housing 60 includes a fluid inlet 64, a first fluid outlet 66 and a second fluid outlet 68. In the illustrated embodiments, the fluid inlet 64 is arranged adjacent a first end 70 of the housing 60, the first fluid outlet 66 is arranged adjacent a second, opposite end 72 of the housing 60, and the second fluid outlet 68 is arranged generally centrally along an axis X defined by the separator 36. However, other configurations of the separator housing 60 are also contemplated herein.

At least one separation component 40 is mounted within the hollow interior 62 of the housing 60. As shown in FIG.

3, in an embodiment, the at least one separation component 40 includes a plurality of degassing tubes positioned longitudinally within the hollow interior 62 of the housing 60. In an embodiment, each of the degassing tubes includes a body 74 formed from a ceramic zeolite material. The degassing tubes may additionally include a metal connector 76 mounted at each end of the body 74, as shown in the FIG. 3. The metal connectors 76 may be used to mount or connect the degassing tubes to another component. In the illustrated, non-limiting embodiment, the plurality of degassing tubes are aligned with each other and are spaced apart from one another to permit a transverse fluid flow between adjacent degassing tubes.

The separator 36 additionally includes one or more baffle or header plates 78 for mounting the degassing tubes within the hollow interior 62 of the housing 60. As shown, each header plate 78 includes a plurality of openings formed therein, and an end of each degassing tube, and more specifically a metal connector 76 of each degassing tube, is receivable within a corresponding opening of the plurality of openings of each header plate 78. In the illustrated, non-limiting embodiment, an outer diameter of each of the header plates 78 is complementary to an inner diameter of the housing 60. As a result, the header plates 78 act as partitions or dividers to separate the hollow interior 62 of the housing 60 into a plurality of zones, such as a first zone 80, a second zone 82, and a third zone 84 for example. The first zone 80 is in fluid communication with the fluid inlet 64, the second zone 82 is in fluid communication with the second fluid outlet 68, and the third zone 84 is in fluid communication with the first fluid outlet 66. It should be understood that the separator 36 may include additional baffles spaced longitudinally over the body 74 of the tubes 40 to support the plurality of degassing tubes. In such embodiments, the size and contour of the additional baffles, may but need not be complementary to the hollow interior 62 of the housing 60.

During operation, a refrigerant including contaminants output from the purge collector 32 is provided to the first zone 80 of the hollow interior 62 of the separator 36 via the fluid inlet 64. From the first zone 80, the refrigerant is provided to the plurality of degassing tubes. As the refrigerant flows through the degassing tubes 40, at least a portion of the contaminants contained therein, such as air for example, diffuses through the sidewalls of the degassing tubes into the second zone 82 of the hollow interior 62 of the housing 60. From the second zone, the contaminants may be exhausted from the separator 36 via the second fluid outlet 68. Accordingly, the refrigerant provided to the third zone 84 of the hollow interior 62 via the degassing tubes has a reduced concentration of contaminants compared to the refrigerant provided to the first zone 80 of the hollow interior 62. Once output into the third zone 84, the refrigerant is provided to the first fluid outlet 66, for return to the heat pump 10, such as via the conduit 44 for example. Accordingly, in the non-limiting embodiment of FIG. 3, the contaminated refrigerant is provided to an interior of the degassing tubes, and the contaminants separated therefrom transfer radially outwardly to an exterior of the degassing tubes.

In another embodiment, best shown in FIGS. 4 and 5, the contaminated refrigerant contact an exterior surface of the at least one separation component 40, and the contaminants separated therefrom may transfer radially inwardly into an interior of the at least one separation component 40. For example, in the non-limiting embodiment of FIGS. 4-5, the at least one separation component 40 includes one or more inorganic membranes having a porous surface through which gas, but not refrigerant, can diffuse. As shown, a single membrane 40 is mounted generally centrally within the hollow interior along the longitudinal axis X. However, it should be understood that embodiments including a plurality of membranes are also within the scope of the disclosure. The separation component 40 generally includes a hollow interior 86 having a sealed first end 88 located near the first end 70 of the housing 60, and a second, open end 90, positioned adjacent the second, opposite end 72 of the housing 60.

During operation of the system of FIGS. 4 and 5, a contaminated refrigerant output from the purge collector 32 is provided to the first zone 80 of the hollow interior 62 of the housing 60 of the separator 36 via the fluid inlet 64. From the first zone 80, the refrigerant flows through one or more openings 92 formed in the first header plate 78 into the second zone 82. Within the second zone 82, the contaminated refrigerant contacts the exterior surface 94 of the at least one separation component 40, causing the contaminants, such as air for example, to diffuse through the sidewall and into the hollow interior 86 of the separation component 40. From the hollow interior 86 of the separation component 40, the contaminants may be provided to the third zone 84, and ultimately, to the first fluid outlet 66 where the contaminants may be exhausted from the purge system 30. The refrigerant within the second zone 82 is provided to the second fluid outlet 68 for return to the heat pump 10, such as via the conduit 44 for example. By positioning the second fluid outlet 68 at the downstream end of the second zone 82 relative to the direction of flow through the separator 36, the refrigerant output from the separator 36 has a reduced concentration of contaminants therein compared to the refrigerant provided to the fluid inlet 64 of the separator 36.

In the illustrated, non-limiting embodiments of FIGS. 4 and 5, the header plate 78 positioned adjacent the first end 70 of the separator 36 includes one or more holes 92 through which refrigerant within the first zone 80 is communicated to the second zone 82. In such embodiments, one or more turbulence-generating features 96 may be mounted within the hollow interior 62 of the housing 60, generally adjacent to the at least one separation component 40. The turbulence-generating features 96 are intended to mix or interrupt the flow within the second zone 82 of the housing 60, thereby increasing and/or maximizing the contact between the contaminated refrigerant and the exterior surface 94 of the separation component 40. Including one or more the turbulence-generating will not only improve the performance of the purge system 30, but will also increase the robustness and reliability of the separator 36. Examples of suitable turbulence-generating features 96 include, but are not limited to turbulators, baffles, vortex creators, oscillators, and ejectors. In embodiments including a plurality of turbulence-generating features 96, the turbulence-generating features 96 may vary in one or more of type, size, and shape, or alternatively, may be substantially identical.

Vibration generated by operation of the heat pump 10 may damage the separation component 40, thereby reducing the functionality of the purge system 30. Accordingly, in an embodiment, the separation component 40 may be isolated from the vibration of the heat pump 10. With reference again to FIG. 3, in an embodiment, the separator 36 includes one or more vibration isolators 100. The vibration isolators may be formed form a flexible material, such as elastomer or rubber for example, and are configured to dampen vibrations by absorbing energy. In the illustrated, non-limiting embodiment, the vibration isolators 100 are vibration dampening pads positioned at an intermediate portion of the separation component 40, such as at the interface between the body 74 and the metal connectors 76 for example. In such embodiments, the vibration isolators 100 function as a connector suitable for use with both a ceramic material and metal material. Accordingly, vibrations from the heat pump 10, which may be transmitted from the separator housing 60 to the metal connectors 76 via the header plate 78, are dampened by the one or more vibration isolators 100 mounted at each end of the separation component 40. In other embodiments, each separation component 40 may include a plurality of layers, and the vibration isolator 100 located at an intermediate portion of the separation component 100 may be positioned between adjacent layers thereof.

Figure 6:
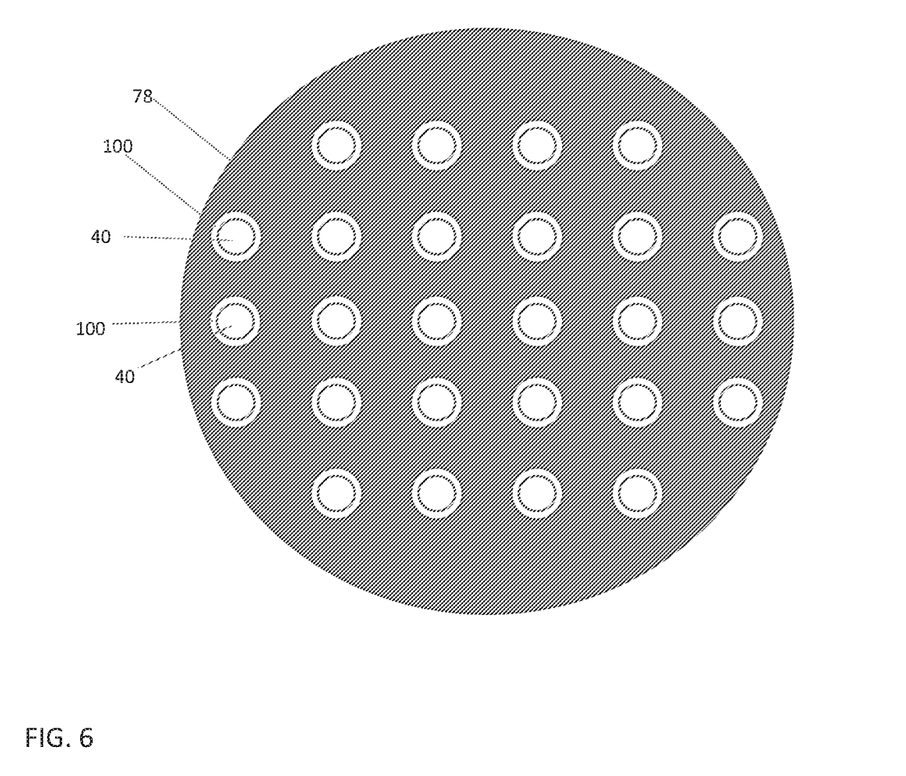
FIG. 6 is an end view of a header plate of a separator of a purge system according to an embodiment.

In another embodiment, beset shown in FIG. 6, the vibration isolators 100 may be arranged at the interface between the separation component 40 and the header plates 78 or other components used to mounted the separation component 40 within the hollow interior 62 of the housing 60. Alternatively, or in addition, the vibration isolators 100 may be positioned at the interface between the separator 36 and the remainder of the purge system 30. For example, a vibration isolator 100 may be mounted at the portion of the housing 60 defining at least one of the fluid inlet 64, the first fluid outlet 66, and the second fluid outlet 68.

A purge system 30 including one or more vibration isolators 100 for limiting the vibration transmitted to the separator 36 and/or the separation component 40 ensures longer operation and durability of the separation component, while achieving minimal refrigerant loss, and lower operating and maintenance costs.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A separator for removing contamination from a fluid of a heat pump comprising:
    a housing having a hollow interior;
    at least a first baffle and a second baffle arranged within the hollow interior of the housing to form a plurality of fluidly distinct zones spaced along a longitudinal axis of the housing including at least a first zone, a second zone, and a third zone, wherein an inlet is formed in the first zone, a first outlet is formed in the second zone, and a second outlet is formed at the third zone, the first baffle having a plurality of openings formed therein to fluidly couple the first zone and the second zone;
    a separation component mounted within only a portion of the plurality of zones of the hollow interior; and
    at least one turbulence-generating element positioned within the second zone of the hollow interior adjacent the separation component, the at least one turbulence-generating element being mounted to an interior surface of the housing.

2. The separator of claim 1, wherein the at least one turbulence-generating element extends into a flow of the fluid adjacent to the separation component.

3. The separator of claim 2, wherein the at least one turbulence-generating element extends adjacent to an exterior surface of the separation component.

4. The separator of claim 1, wherein the at least one turbulence-generating element includes a baffle.

5. The separator of claim 1, wherein the at least one turbulence-generating element includes a turbulator.

6. The separator of claim 1, wherein the at least one turbulence-generating element includes an ejector.

7. The separator of claim 1, wherein the at least one turbulence-generating element includes a plurality of turbulence-generating elements spaced along a longitudinal axis of the separation component.

8. The separator of claim 7, wherein the plurality of turbulence-generating elements are substantially identical.

9. The separator of claim 7, wherein a configuration of at least one of the plurality of turbulence-generating elements varies from a configuration of a remainder of the plurality of turbulence-generating elements.

10. A separator for removing contamination from a fluid of a heat pump system comprising:
    a housing having a hollow interior;
    a separation component mounted within the hollow interior;
    a metal connector arranged at at least one end of the separation component, the metal connector having an opening configured to receive the separation component to mount the separation component within the hollow interior; and
    at least one vibration isolator arranged between an exterior surface of the separation component and an adjacent surface of the opening of the metal connector, wherein the at least one vibration isolator forms an interface between the separation component and the opening of the metal connector.

11. The separator of claim 10, wherein the at least one vibration isolator is positioned at an intermediate portion of the separation component.

12. The separator of claim 10, wherein the separation component is mounted within the hollow interior by at least one header plate.

13. The separator of claim 12, wherein the at least one vibration isolator is mounted between the separation component and the at least one header plate.

14. The separator of claim 10, wherein the at least one vibration isolator is mounted at a portion of the separator fluidly connectable to the heat pump system.

15. The separator of claim 10, wherein the at least one vibration isolator is mechanically connected, but not fluidly connected to the heat pump system.

16. The separator of claim 10, wherein the at least one vibration isolator is formed from a flexible material.

17. The separator of claim 10, wherein the at least one vibration isolator is a vibration dampening pad.

* * * * *